United States Patent
Deng et al.

(10) Patent No.: US 10,067,849 B2
(45) Date of Patent: *Sep. 4, 2018

(54) DETERMINING DYNAMIC STATISTICS BASED ON KEY VALUE PATTERNS

(71) Applicant: INTERNATIONAL BUSINESS MACHINES CORPORATION, Armonk, NY (US)

(72) Inventors: Xiao Di Deng, Beijing (CN); Shuo Li, Beijing (CN); Shu Hua Liu, Beijing (CN); Wei Liu, Beijing (CN); Meng Wan, Beijing (CN); Xiaobo Wang, Beijing (CN); Xin Ying Yang, Beijing (CN); Chen Xin Yu, Beijing (CN); Xiong Wei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,429

(22) Filed: Jul. 25, 2017

(65) Prior Publication Data

US 2017/0344454 A1    Nov. 30, 2017

Related U.S. Application Data

(63) Continuation of application No. 15/165,368, filed on May 26, 2016.

(51) Int. Cl.
*G06F 17/30* (2006.01)
*G06F 11/34* (2006.01)

(52) U.S. Cl.
CPC .... *G06F 11/3452* (2013.01); *G06F 17/30315* (2013.01); *G06F 17/30353* (2013.01); *G06F 17/30377* (2013.01); *G06F 17/30592* (2013.01)

(58) Field of Classification Search
CPC .......... G06F 11/3452; G06F 17/30315; G06F 17/30353; G06F 17/30377; G06F 17/30592
See application file for complete search history.

(56) References Cited

U.S. PATENT DOCUMENTS 6,122,640 A  *  9/2000  Pereira .............. G06F 17/30339
                                                         707/648
7,831,592 B2    11/2010  Markl et al.
(Continued)

OTHER PUBLICATIONS

IBM, "Improving Filter Factors by Collecting Cardirtality and Frequency Statistics," IBM DB2 10 for z/OS Documentation, p. 1-3, IBM Knowledge Center, http://www.ibm.com/support/knowledgecenter/api/content/nl/en-us/SSEPEK_10.0.0/com.ibm.db2z10.doc.perf/src/tpc/db2z_filterfactorcatalogstats.dita, Accessed on May 9, 2016.

(Continued)

*Primary Examiner* — Huawen A Peng
(74) *Attorney, Agent, or Firm* — Erik K. Johnson; Reza Sarbakhsh

(57) ABSTRACT

A method for dynamically updating database statistics and a plurality of access paths associated with at least one database table is provided. The method may include identifying at least one dynamically changing column associated with the at least one database table. The method may further include determining at least one predicate pattern associated with the identified at least one dynamically changing column. Additionally, the method may include dynamically detecting at least one range change associated with the determined at least one predicate pattern based on at least one record insert. The method may also include updating the plurality of database statistics associated with the identified at least one dynamically changing column based on the dynamically detected at least one range change. The method (Continued)

may further include determining at least one filter factor based on the updated plurality of database statistics associated with the identified at least one dynamically changing column.

1 Claim, 5 Drawing Sheets

(56) References Cited

U.S. PATENT DOCUMENTS

| | | | |
|---|---|---|---|
| 8,204,873 B2 | 6/2012 | Chavan | |
| 9,043,307 B2 | 5/2015 | Abdo et al. | |
| 9,063,973 B2 | 6/2015 | Bossman et al. | |
| 9,128,965 B1* | 9/2015 | Yanacek | G06F 17/30292 |
| 2008/0162416 A1 | 7/2008 | Sinclair | |
| 2008/0275840 A1 | 11/2008 | Burger et al. | |
| 2009/0292711 A1* | 11/2009 | Konik | G06F 17/3051 |
| 2013/0166556 A1* | 6/2013 | Baeumges | G06F 17/30339 707/737 |
| 2013/0166566 A1 | 6/2013 | Lemke et al. | |
| 2015/0006567 A1 | 1/2015 | Finnerty et al. | |
| 2015/0363447 A1* | 12/2015 | Dickie | G06F 17/30492 707/696 |
| 2015/0363468 A1* | 12/2015 | Alvey | G06F 17/30315 707/769 |
| 2017/0052989 A1* | 2/2017 | Bensberg | G06F 17/30339 |

OTHER PUBLICATIONS

Mell et al., "The NIST Definition of Cloud Computing," National Institute of Standards and Technology, Sep. 2011, p. 1-3, Special Publication 800-145.

Deng et al., U.S. Appl. No. 15/165,368, filed May 26, 2016, titled "Determining Dynamic Statistics Based on Key Value Patterns,", pp. 1-32.

IBM: List of IBM Patents or Patent Applications Treated As Related (Appendix P), Jul. 25, 2017, pp. 1-2.

* cited by examiner

DETERMINING DYNAMIC STATISTICS BASED ON KEY VALUE PATTERNS

BACKGROUND

The present invention relates generally to the field of computing, and more specifically, to data statistics.

Generally, RUNSTATS online utility gathers statistics of data in table spaces, indexes, and partitions. DB2® ((DB2 and all DB2-based trademarks and logos are trademarks or registered trademarks of International Business Machines and/or its affiliates) records these statistics in the DB2® system catalog and uses the statistics to select access paths to the data. Specifically, the RUNSTATS command may be used to gather and update table statistics associated with database tables, such as database tables that may include information on a shopping database systems and/or account database systems. The table statistics may include the number of records, the number of pages, the average record length, and the date and timestamp of when the records are inserted into the table. Typically, RUNSTATS is a command that is performed statically, and therefore, gathers and updates the statistics intermittently.

SUMMARY

A method for dynamically updating a plurality of database statistics and a plurality of access paths associated with at least one database table is provided. The method may include identifying at least one dynamically changing column associated with the at least one database table. The method may further include determining at least one predicate pattern associated with the identified at least one dynamically changing column. Additionally, the method may include dynamically detecting at least one range change associated with the determined at least one predicate pattern based on at least one record insert. The method may also include updating the plurality of database statistics associated with the identified at least one dynamically changing column based on the dynamically detected at least one range change. The method may further include determining at least one filter factor based on the updated plurality of database statistics associated with the identified at least one dynamically changing column.

A computer system for dynamically updating a plurality of database statistics and a plurality of access paths associated with at least one database table is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying at least one dynamically changing column associated with the at least one database table. The method may further include determining at least one predicate pattern associated with the identified at least one dynamically changing column. Additionally, the method may include dynamically detecting at least one range change associated with the determined at least one predicate pattern based on at least one record insert. The method may also include updating the plurality of database statistics associated with the identified at least one dynamically changing column based on the dynamically detected at least one range change. The method may further include determining at least one filter factor based on the updated plurality of database statistics associated with the identified at least one dynamically changing column.

A computer program product for dynamically updating a plurality of database statistics and a plurality of access paths associated with at least one database table is provided. The computer program product may include one or more computer-readable storage devices and program instructions stored on at least one of the one or more tangible storage devices, the program instructions executable by a processor. The computer program product may include program instructions to identify at least one dynamically changing column associated with the at least one database table. The computer program product may further include program instructions to determine at least one predicate pattern associated with the identified at least one dynamically changing column. Additionally, the computer program product may also include program instructions to dynamically detect at least one range change associated with the determined at least one predicate pattern based on at least one record insert. The computer program product may further include program instructions to update the plurality of database statistics associated with the identified at least one dynamically changing column based on the dynamically detected at least one range change. The computer program product may also include program instructions to determine at least one filter factor based on the updated plurality of database statistics associated with the identified at least one dynamically changing column.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
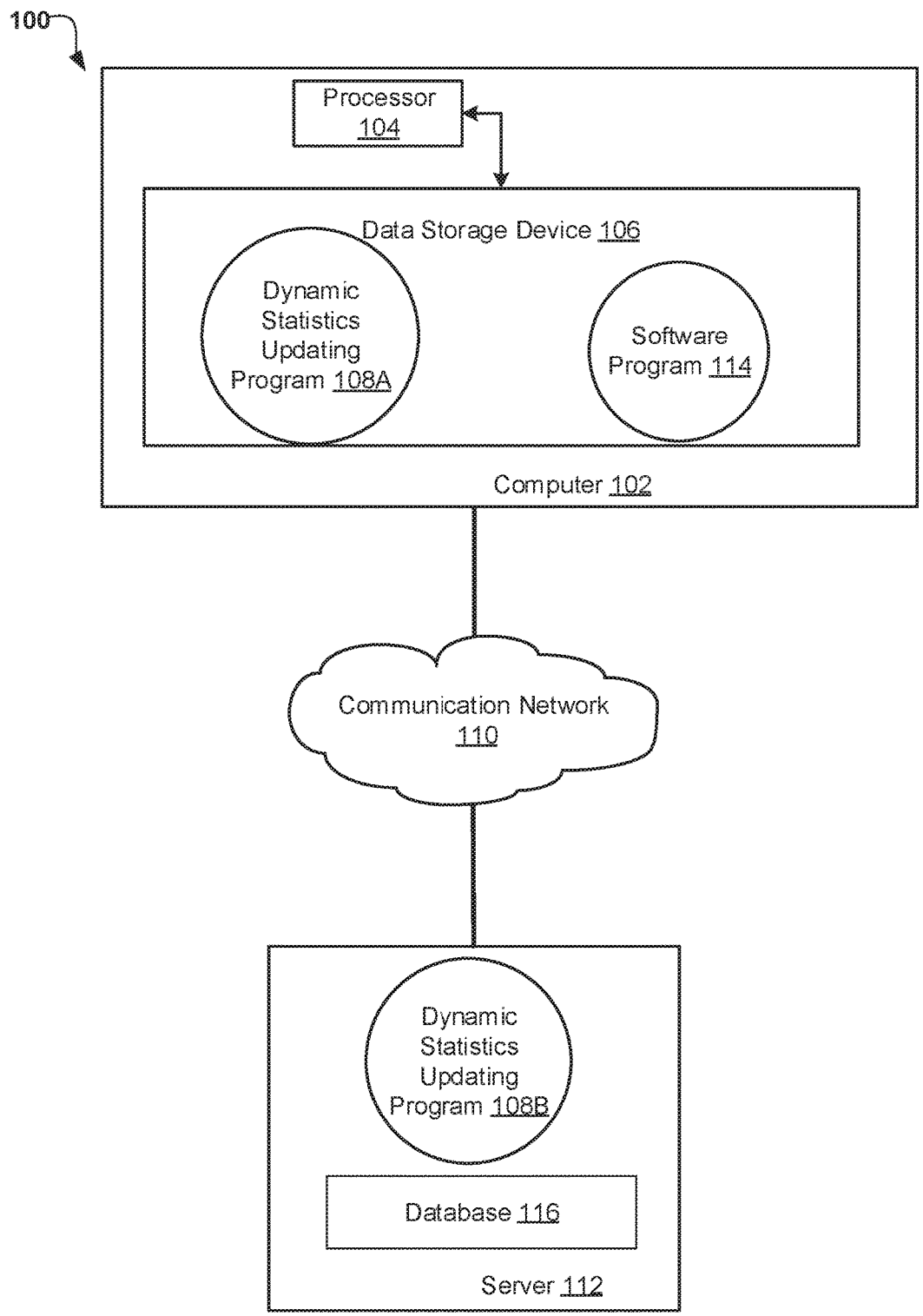
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data analysis. The following described exemplary embodiments provide a system, method and program product for dynamically updating statistics associated with database tables. Therefore, the present embodiment has the capacity to improve the technical field associated with data analysis by providing faster updated access paths to database table information based on dynamically updated statistics and filter factors associated with the database tables. Specifically, the present embodiment may detect dynamically changing columns associated with database tables, detect table record insertions on the database tables, determine ranges associated with the dynamically changing columns based on the detected table record insertions, and calculate filter factors for the database table based on the determined ranges to provide faster access paths.

As previously described with respect to data analysis, RUNSTATS is an online utility that may be used to gather and update the statistics of data in table spaces, indexes, and partitions. For example, and as previously described, the RUNSTATS command may be used to analyze values and update statistics associated with database tables such as the number of records, the number of pages, the average record length, the range of values associated with records, and the date and timestamp of when the records are received on the database tables. However, and also as previously described, RUNSTATS is a command that is typically performed statically based on records associated with database tables, and therefore, the statistics associated with the database tables are collected intermittently as opposed to on a dynamic real-time basis. Therefore, execution of the RUNSTATS command may not accurately gather the statistics associated with database tables because new table records inserted on the database tables may not be timely recorded and may also change the range of data associated with the database tables. Furthermore, because the RUNSTATS command may not accurately gather the statistics associated with the database tables, access paths for optimizers to the gathered statistics may take more time based on a table scan by the RUNSTATS command because the RUNSTATS command may perform a full table scan, and/or a scan based on the last executed RUNSTATS command, as opposed to a scan based on real-time data.

For example, a structured query language (SQL) statement such as—SELECT FROM*T1, WHERE ACCOUNT_DATE BETWEEN CURRENT_DATE−1 DAY and CURRENT_DATE—may be initiated on a database table consisting of account data. Specifically, based on the SQL statement, a range account data from a table 1 of the database table may be selected based on a current date and a current date−1 day to satisfy the SQL. However, because RUNSTATS is a command that is typically performed statically, the real-time range may not be accurately reflected on the database table to satisfy the SQL statement. As such, it may be advantageous, among other things, to provide a system, method and program product for dynamically updating statistics and access paths associated with database tables, whereby the statistics may include ranges for columns associated with the database tables. Specifically, the system, method, and program product may identify dynamically changing columns associated with database tables, detect incoming table records on the dynamically changing columns, determine ranges associated with the dynamically changing columns based on the detected incoming table records, and calculate filter factors for the database table based on the determined ranges to provide updated access paths.

According to at least one implementation of the present embodiment, dynamically changing columns associated with database tables may be identified. Next, incoming table records may be detected on the identified dynamically changing columns. Then, ranges associated with the identified dynamically changing columns may be determined based on the detected incoming table records. Next, filter factors may be calculated based on the determined ranges associated with the identified dynamically changing columns.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for dynamically updating statistics and access paths associated with database tables.

According to at least one implementation, dynamically changing columns associated with database tables may be identified. Next, incoming table records may be detected on the identified dynamically changing columns. Then, ranges associated with the identified dynamically changing columns may be determined based on the detected incoming table records. Next, filter factors may be calculated based on the determined ranges associated with the identified dynamically changing columns.

Referring now to FIG. 1, an exemplary networked computer environment 100 in accordance with one embodiment is depicted. The networked computer environment 100 may include a computer 102 with a processor 104 and a data storage device 106 that is enabled to run a dynamic statistics updating program 108A and a software program 114. The software program 114 may be an application program such as Firefox® (Firefox and all Firefox-based trademarks and logos are trademarks or registered trademarks of Mozilla and/or its affiliates). The dynamic statistics updating program 108A may communicate with the software program 114. The networked computer environment 100 may also include a server 112 that is enabled to run a dynamic statistics updating program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the dynamic statistics updating program 108A, 108B may interact with a database 116 that may be embedded in various storage devices, such as, but not limited to a mobile device 102, a networked server 112, or a cloud storage service.

According to the present embodiment, a program, such as a dynamic statistics updating program 108A and 108B may run on the client computer 102 or on the server computer 112 via a communications network 110. The dynamic statistics updating program 108A, 108B may dynamically update statistics and access paths associated with database tables. Specifically, a user using a computer, such as computer 102, may run a dynamic statistics updating program 108A, 108B, that interacts with a software program 114, to determine the dynamically changing columns associated with database tables, detect incoming table records on the dynamically changing columns, determine ranges associated with the dynamically changing columns based on the detected incoming table records, and calculate filter factors for the database table based on the determined ranges to provide updated access paths.

Figure 2:
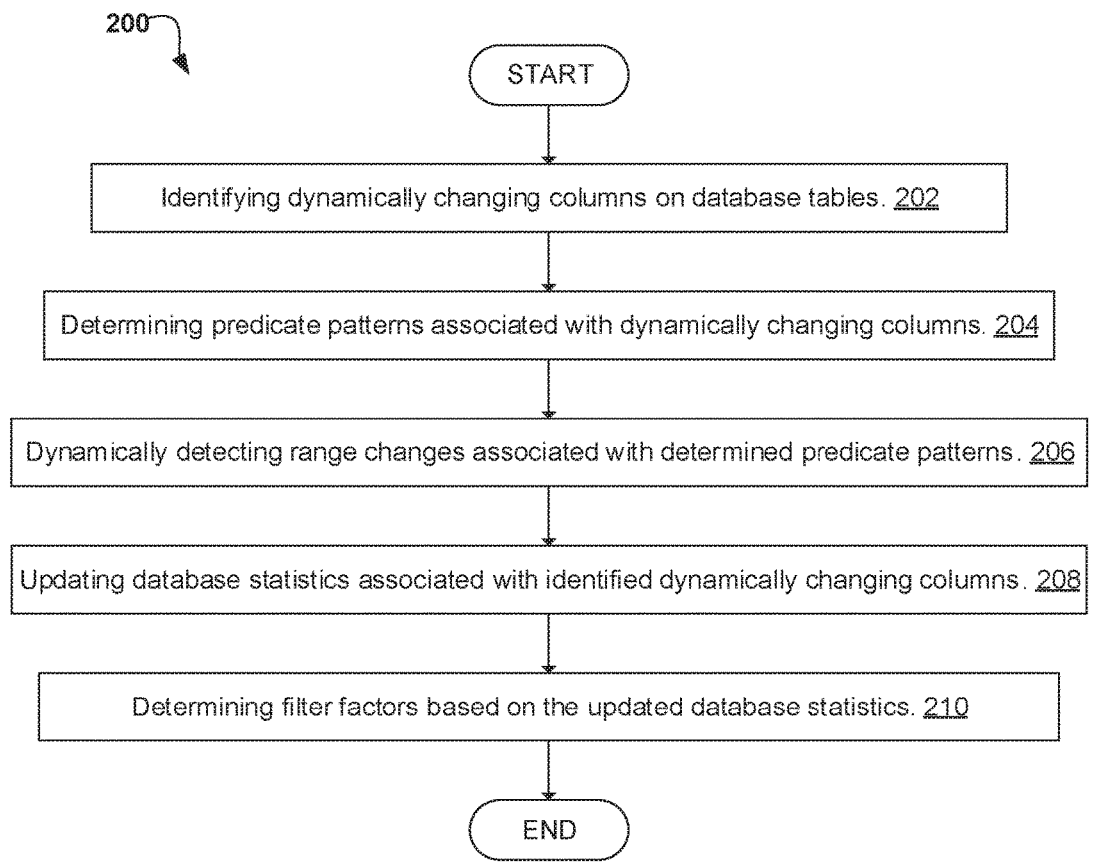
FIG. 2 is an operational flowchart illustrating the steps carried out by a program for dynamically updating a plurality of database statistics and a plurality of access paths associated with at least one database table according to one embodiment.

Referring now to FIG. 2, an operational flowchart 200 illustrating the steps carried out by a program for dynamically updating statistics and access paths associated with database tables is depicted. At 202, the dynamic statistics updating program 108A, 108B (FIG. 1) may identify the dynamically changing columns associated with database tables. Specifically, the dynamic statistics updating program 108A, 108B (FIG. 1) may identify the dynamically changing columns by identifying columns qualified by predicates that may include dynamically changing parameters, and/or by identifying columns that may include increasing data. More specifically, the dynamic statistics updating program 108A, 108B (FIG. 1) may analyze columns that may include parameters such as date, time, and timestamp, to determine whether data on the columns are increasing and/or changing.

For example, and as previously described, database tables may include statistics associated with database systems such as an account database system. Specifically, for account database systems, the dynamic statistics updating program 108A, 108B (FIG. 1) may analyze columns on the database table and determine that transactions associated with accounts may be recorded on the database tables associated with the account database systems. More specifically, the dynamic statistics updating program 108A, 108B (FIG. 1) may determine that the transaction records may be recorded on columns associated with the database table for the account database system, and the columns may include columns for recording the transactions, date, time, and/or timestamp of the transactions. Furthermore, the dynamic statistics updating program 108A, 108B (FIG. 1) may determine patterns whereby the columns associated with the transaction records on the database table may dynamically increase with incoming transaction records. Therefore, the dynamic statistics updating program 108A, 108B (FIG. 1) may identify the columns for recording the transactions, dates, time, and/or timestamp on the database table as dynamically changing columns.

Then, at 204, the dynamic statistics updating program 108A, 108B (FIG. 1) may determine predicate patterns associated with the identified dynamically changing columns. As previously described at step 202, the dynamic statistics updating program 108A, 108B (FIG. 1) may identify dynamically changing columns such as columns that may include parameters such as date, time, and timestamp. Thereafter, the dynamic statistics updating program 108A, 108B (FIG. 1) may determine predicate patterns associated with the identified dynamically changing columns, whereby determining predicate patterns may include determining ranges whereby the identified dynamically changing columns change or increase based on the parameters such as the dates, times, and/or timestamps, and qualifying the identified dynamically changing columns based on the determined ranges. For example, the dynamic statistics updating program 108A, 108B (FIG. 1) may determine that there is a range whereby an identified dynamically changing column changes on an account database table between a specified date, such as 10-31-2016, and a current date. Therefore, according to one embodiment, the dynamic statistics updating program 108A, 108B (FIG. 1) may determine that at least one predicate pattern for the identified dynamically changing column is Account_Data BETWEEN 10-31-2016 AND CURRENT DATE. Furthermore, the dynamic statistics updating program 108A, 108B (FIG. 1) may qualify the identified dynamically changing column by the at least one predicate pattern, whereby qualifying the identified dynamically changing column by the at least one predicate pattern estimates the portion of the identified dynamically changing column for which the determined range, based on the at least one predicate pattern, is true.

Next, at 206, the dynamic statistics updating program 108A, 108B (FIG. 1) may dynamically detect range changes associated with the determined predicate patterns based on record inserts. Specifically, according to one embodiment, the dynamic statistics updating program 108A, 108B (FIG. 1) may dynamically detect range changes by detecting record inserts on the identified dynamically changing columns, whereby the record inserts may include new records that are received on the identified dynamically changing columns. Thereafter, the dynamic statistics updating program 108A, 108B (FIG. 1) may determine whether the detected record inserts change the range (i.e. increase the range) that is associated with the determined predicate patterns by monitoring key styles associated with the identified dynamically changing columns. More specifically, the key styles may include HighKeys and LowKeys that represent the highest values and lowest values, respectively, that are associated with the determined predicate patterns of the identified dynamically changing columns, and the dynamic statistics updating program 108A, 108B (FIG. 1) may dynamically detect range changes by monitoring the key styles.

For example, for an account database table, the dynamic statistics updating program 108A, 108B (FIG. 1) may detect record inserts, such as new transaction records, that are received on the identified dynamically changing columns. Thereafter, the dynamic statistics updating program 108A, 108B (FIG. 1) may determine whether the detected record inserts change the range associated with the determined predicate patterns by monitoring the key styles associated with the identified dynamically changing columns. Specifically, the dynamic statistics updating program 108A, 108B (FIG. 1) may determine that there is a pattern of changes associated with an identified dynamically changing column on an account database table with the changes ranging between a specified date, such as 10-31-2016, and a current date. Therefore, the dynamic statistics updating program 108A, 108B (FIG. 1) may monitor the key styles associated with the determined predicate pattern by monitoring the HighKey associated with the current date and the LowKey associated with the date 10-31-2016. Thereafter, based on monitoring the HighKey, the dynamic statistics updating program 108A, 108B (FIG. 1) may dynamically detect that the range is increasing and may extend to a current date +1 day.

Then, at 208, the dynamic statistics updating program 108A, 108B (FIG. 1) may update statistics associated with the identified dynamically changing columns based on the dynamically detected range changes. As previously described at step 206, the dynamic statistics updating program 108A, 108B (FIG. 1) may dynamically detect range changes associated with the determined predicate patterns based on record inserts. For example, and as previously described at step 206, the dynamic statistics updating program 108A, 108B (FIG. 1) may determine that there is a pattern of range changes associated with an identified dynamically changing column on an account database table with the changes ranging between a specified date, such as 10-31-2016, and a current date +1 day. Therefore, the dynamic statistics updating program 108A, 108B (FIG. 1) may update the statistics associated with the determined predicate patterns and the identified dynamically changing columns based on the detected range changes.

Next, at 210, the dynamic statistics updating program 108A, 108B (FIG. 1) may determine filter factors based on the updated statistics associated with the identified dynamically changing columns. Specifically, the dynamic statistics updating program 108A, 108B (FIG. 1) may use a formula to determine the filter factors, whereby the formula may be: filter factor (FF)=(B_HIGH−B_LOW)/(HIGH_VALUE−LOW_VALUE), and whereby B_HIGH is a high boundary of the determined predicate pattern, B_LOW is a low boundary of the determined predicate pattern, HIGH_VALUE is a high value associated with the high boundary of the determined predicate pattern, and LOW_VALUE is a low value associated with the low boundary of the determined predicate pattern. For example, the dynamic statistics updating program 108A, 108B (FIG. 1) may determine a predicate pattern such as: SELECT*FROM T1, WHERE Account_Data BETWEEN CURRENT DATE−30 Days AND CURRENT DATE. Furthermore, based on the determined predicate pattern, the dynamic statistics updating program 108A, 108B (FIG. 1) may detect the range and determine that the LOW_VALUE is 05:01:2016 and the HIGH_VALUE is 06:30:2016. Therefore, the dynamic statistics updating program 108A, 108B (FIG. 1) may determine the filter factor based on the formula, FF=(CURRENT DATE−(CURRENT DATE−30 DAYS))/(06:30:2016−05:01:2016)=0.5. As such, based on the filter factors, the dynamic statistics updating program 108A, 108B (FIG. 1) may provide updated access paths to updated database statistics.

It may be appreciated that FIG. 2 provides only illustrations of one implementation and does not imply any limitations with regard to how different embodiments may be implemented. Many modifications to the depicted environments may be made based on design and implementation requirements.

Figure 3:
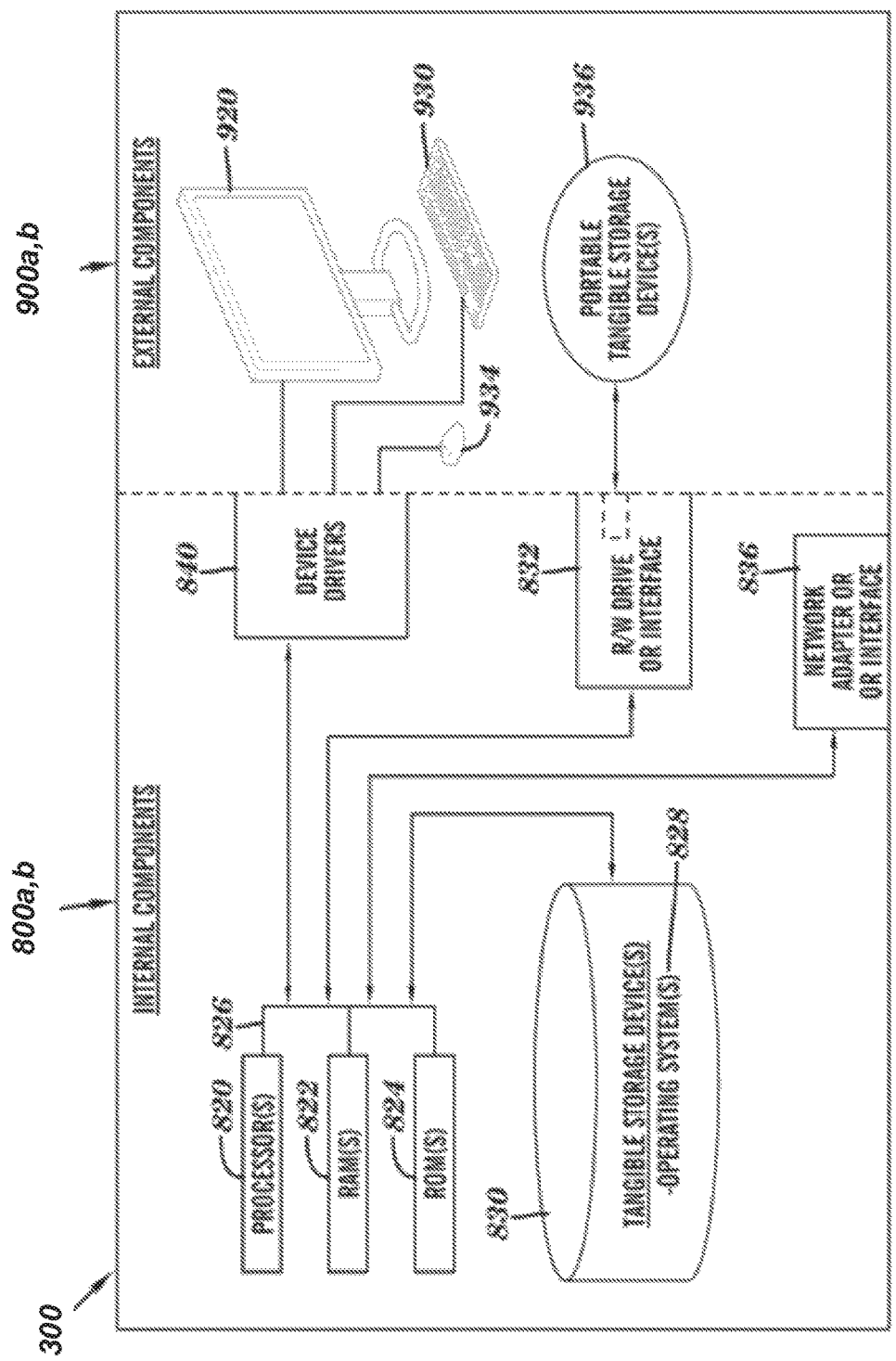
FIG. 3 is a block diagram of the system architecture of a program for dynamically updating a plurality of database statistics and a plurality of access paths associated with at least one database table according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 3. Each of the sets of internal components 800 *a, b* includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the dynamic statistics updating program 108A (FIG. 1) in client computer 102 (FIG. 1), and the dynamic statistics updating program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a dynamic statistics updating program 108A and 108B (FIG. 1), can be stored on one or more of the respective portable computer-readable tangible storage devices 936, read via the respective R/W drive or interface 832, and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The dynamic statistics updating program 108A (FIG. 1) and software program 114 (FIG. 1) in client computer 102 (FIG. 1), and the dynamic statistics updating program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the dynamic statistics updating program 108A (FIG. 1) and software program 114 (FIG. 1) in client computer 102 (FIG. 1) and the dynamic statistics updating program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
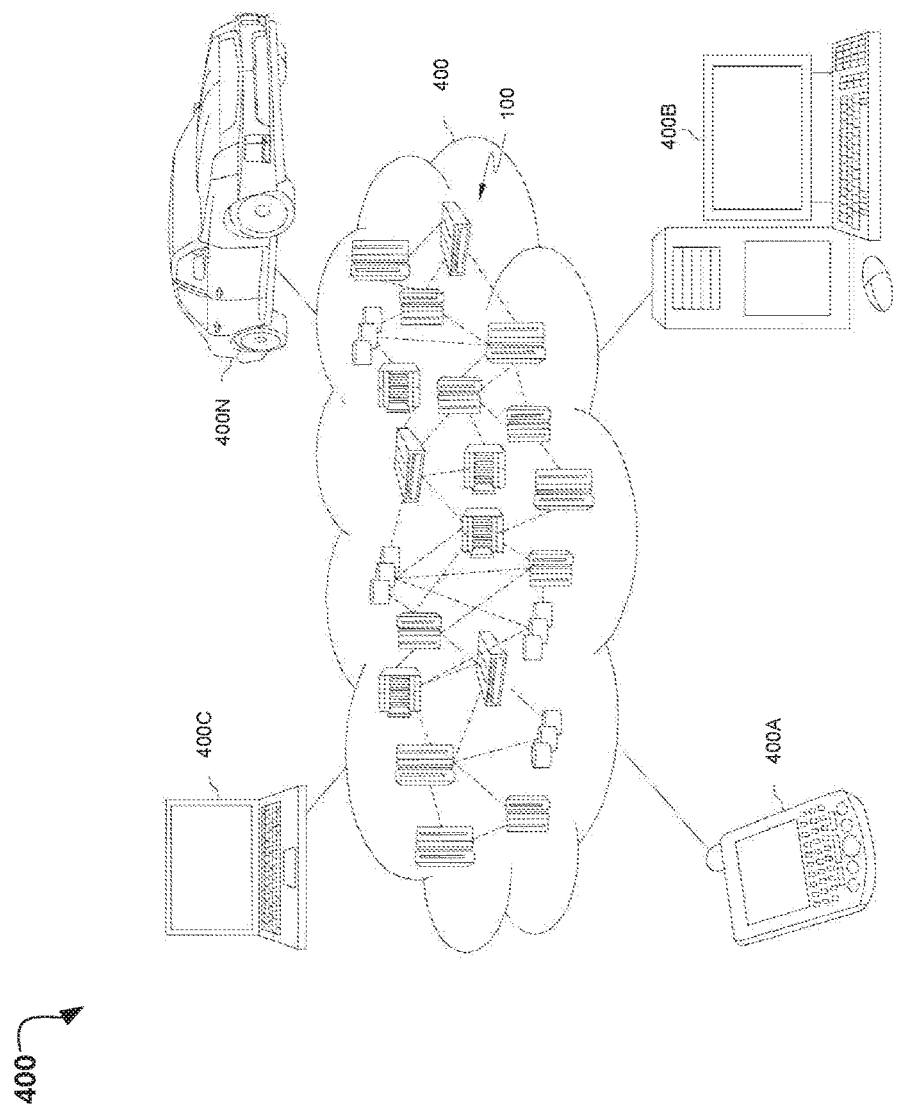
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
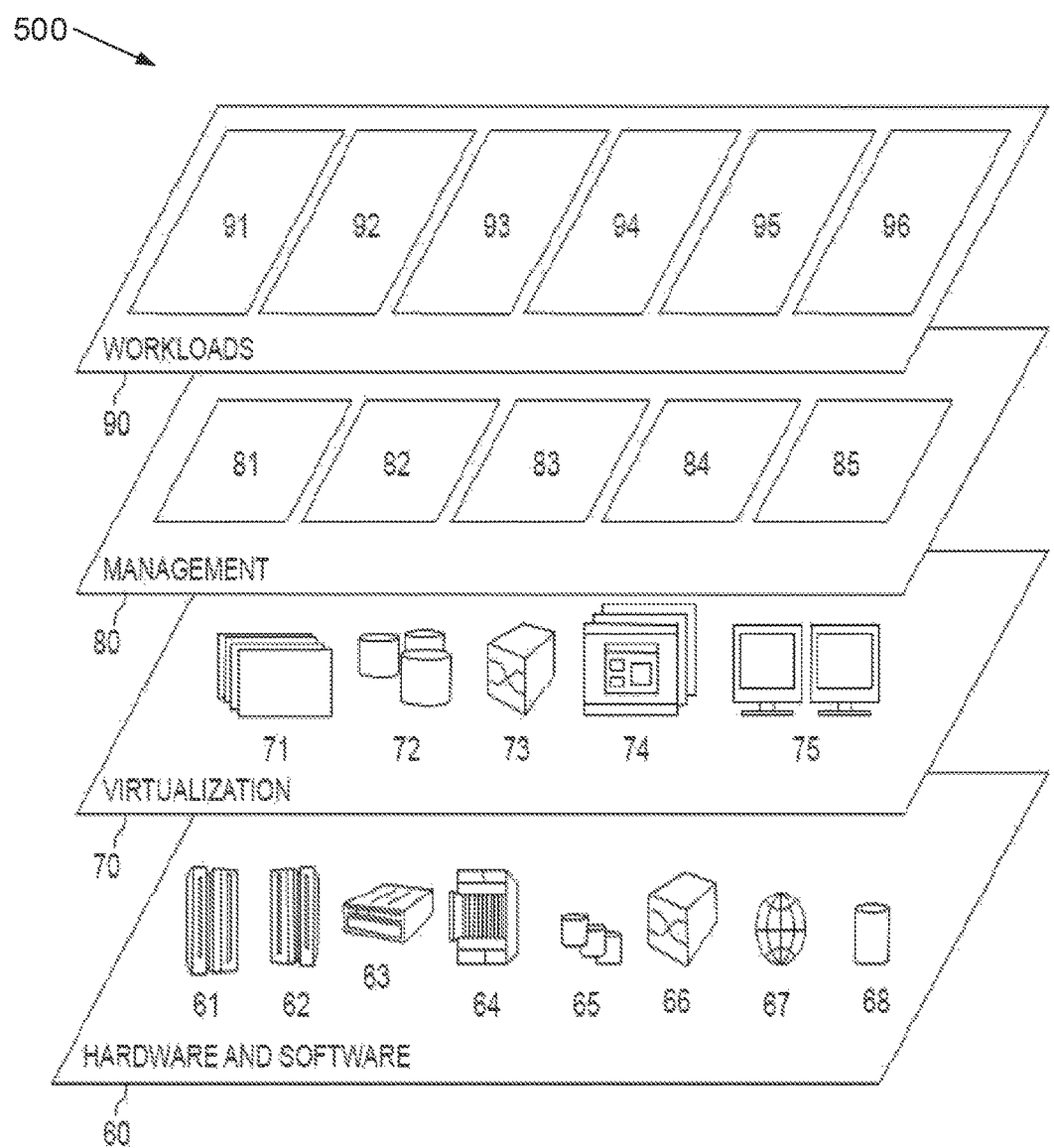
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic statistics updating 96. A dynamic statistics updating program 108A, 108B (FIG. 1) may be offered "as a service in the cloud" (i.e., Software as a Service (SaaS)) for applications running on mobile devices 102 (FIG. 1) and may dynamically update statistics and access paths associated with database tables.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically providing access paths to dynamically updated data associated with at least one database table, the method comprising:

identifying at least one dynamically changing column associated with the at least one database table;

identifying at least one predicate associated with the at least one dynamically changing column, wherein the at least one predicate comprises a dynamically changing parameter;

determining at least one predicate pattern associated with the identified at least one dynamically changing column and the dynamically changing parameter by determining at least one range wherein the identified at least one dynamically changing column changes based on at least one dynamically changing parameter, and qualifying the identified dynamically changing column based on the determined at least one range;

dynamically detecting at least one range change associated with the determined at least one predicate pattern based on at least one record insert by detecting the at least one record insert on the identified at least one dynamically changing column, wherein the at least one record insert is a new record that is received on the identified at least one dynamically changing column;

identifying a plurality of key styles associated with the identified at least one dynamically changing column and determining whether the detected at least one record insert changes at least one range that is associated with the determined at least one predicate pattern, wherein the plurality of key styles represent a highest value and a lowest value of the detected at least one range associated with the determined at least one predicate pattern, and the detected at least one range change is based on a change in the plurality of key styles;

updating the plurality of database statistics associated with the identified at least one dynamically changing column based on the dynamically detected at least one range change; and determining at least one filter factor based on the updated plurality of database statistics associated with the identified at least one dynamically changing column by determining the at least one filter factor based on the highest value associated with the determined at least one predicate pattern and the lowest value associated with the determined at least one predicate pattern, whereby the filter factor represents a value at the which the at least one range associated with the determined at least one predicate pattern increased.

* * * * *